May 23, 1939.  J. BRABAK  2,159,248

APPARATUS FOR DESICCATING OR DRYING LIQUIDS OR MOIST SUBSTANCES

Filed Aug. 13, 1935  2 Sheets-Sheet 1

Inventor:
Jörgen Brabak,
By Watson E. Coleman

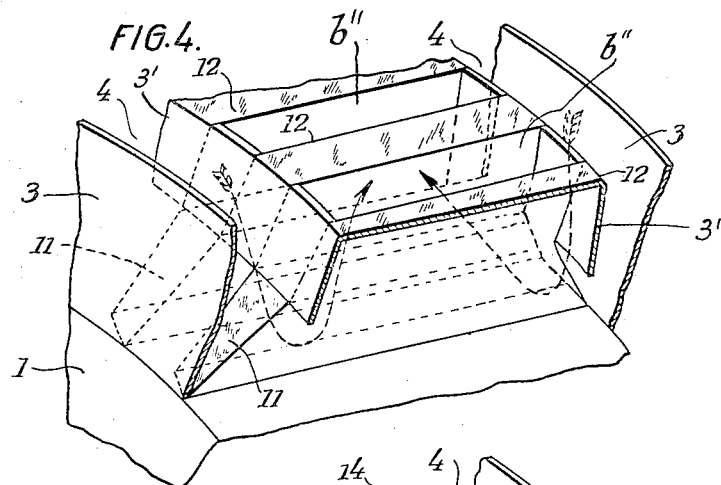
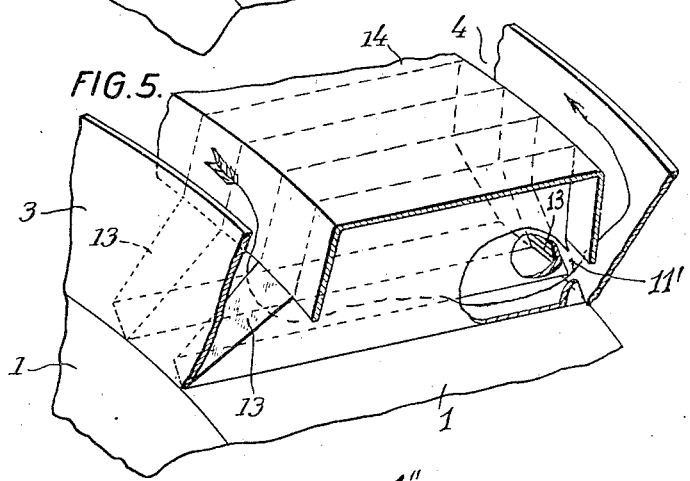
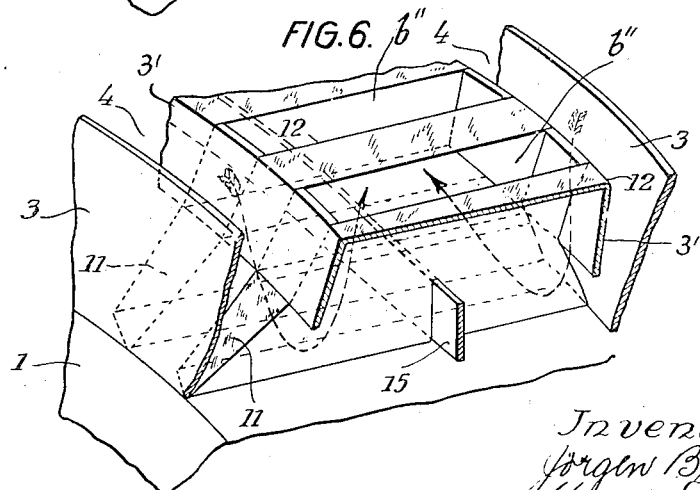

Patented May 23, 1939

2,159,248

UNITED STATES PATENT OFFICE 2,159,248

APPARATUS FOR DESICCATING OR DRYING LIQUIDS OR MOIST SUBSTANCES

Jörgen Brabak, Copenhagen, Denmark

Application August 13, 1935, Serial No. 36,037
In Germany August 22, 1934

6 Claims. (Cl. 159—8)

The present invention relates to the art of desiccating liquids and moist substances which have never heretofore been desiccated with success.

One of the objects of the invention is to provide means for carrying out the desiccating operation in a very short period of time and while keeping the substance treated at a very low temperature.

Another object is to provide means whereby this treatment can be carried into effect without deleteriously affecting the residual desiccated substance in any way as regards taste, smell or the like.

In the drawings:

Figs. 4, 5 and 6 are perspective views partly in section showing three additional forms or embodiments of my invention.

Figure 1:
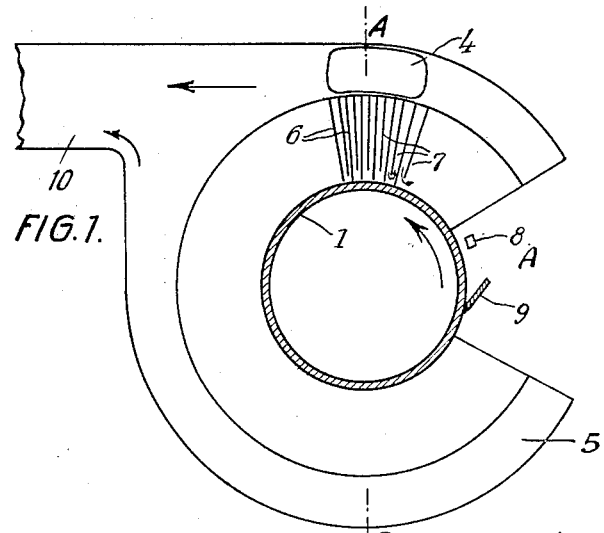
Fig. 1 is a diagrammatic view of one form of a desiccating mechanism constructed in accordance with my invention, the same being a section taken substantially on the line 1—1 of Fig. 2, with a portion broken away.
Figure 2:
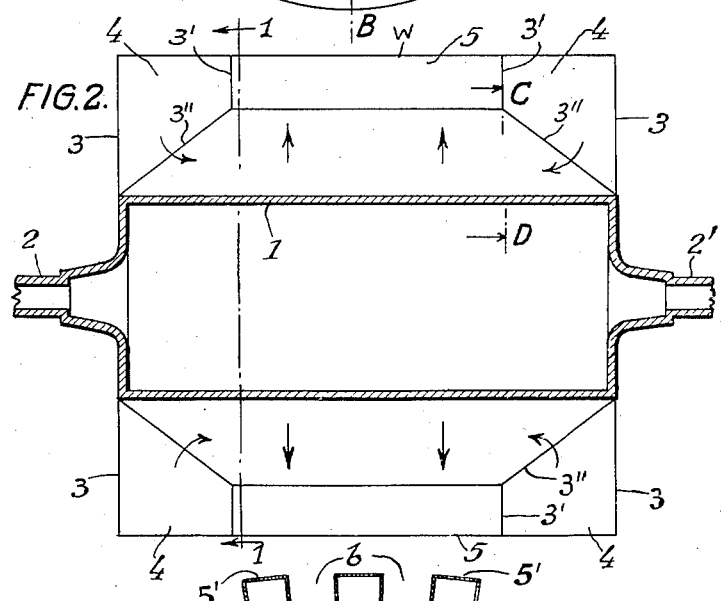
Fig. 2 is a section on the line A—B of Fig. 1.

Referring to the drawings and particularly to Fig. 1, 1 designates a drying drum, to the periphery of which the film of liquid to be desiccated is supplied. The drum is provided with two hollow trunnions 2 and 2', through which a heating medium passes in order to cause the circulation of the heating medium through the drum. Surrounding the drum to any desired extent is a series of plates 6 and 7, as diagrammatically shown in Fig. 3, these plates extending longitudinally of the drum and radially outward therefrom and constituting air inlet and outlet passages or nozzles, as will be later more specifically described. The plates extend the full length of the drum, as shown in Fig. 2, and have inwardly and laterally inclined ends. Connected to said plates are the lateral walls 3, it being understood that the walls 3 and the plates are fixed with relation to the drum so that the drum rotates within the series of plates 6 and 7.

Spaced inwardly from the walls 3 are the walls 3' which are attached to the outer edges of the plates 6 and 7. A wall W may partially encircle the drum between the walls 3' and form a partially annular chamber 5 which merges into the lead-off duct 10. The area between each two adjacent walls 3—3' forms a partially annular chamber 4 from which air may be taken into the ends of the nozzles, hereinafter described. The duct may be connected to an exhaust fan or any other means whereby the air entering the discharge duct may be drawn off. The partially annular chambers 4 may be closed along their outer sides, the air being taken in at the ends of these chambers in the open area designated A, in which area there is also provided a fluid discharge unit of a suitable type which is indicated at 8, and a scraper blade 9 which engages the surface of the drum 1.

In the operation of this form of the device, the air enters the open ends of the channels 4 from the area A and passes from the channels 4, as shown by the arrows in Figure 2, into the ends of the spaces between the plates 6 and 7. The air entering passes beneath the inner edges of the walls 3' into the spaces between the plates 6 and 7, and is forced downwardly into contiguity with the film on the surface of the drum and then passes radially out through the spaces between the adjacent plates 6 and 7 into the chamber 5. This moisture-laden air is then carried off through the discharge duct 10, the air efficiently drying the film of substance on the drum by reason of the impingement of the air against the drum and then passing from the drum to and through the duct 10, as described.

Figure 3:
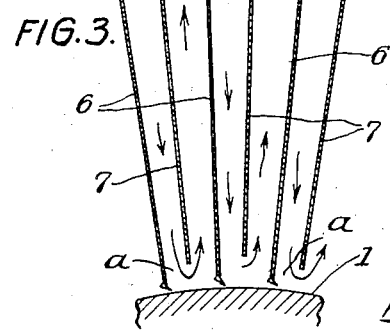
Fig. 3 is an enlarged diagrammatic section on the line C—D of Fig. 2.

The arrangement of the transverse plates 6 and 7 to form inwardly directed nozzles and alternate outwardly directed discharge spaces between the nozzles is best shown in Figure 3. As shown clearly in this figure, the plates 6 extend down into close proximity to the drum 1 while the plates 7 have their lower edges spaced a slightly greater distance from the drum. The plates define between them inwardly contracted nozzles $a$ and alternate upwardly expanding discharge spaces $b$. The inlet nozzles are closed at their outer ends by walls 5' which together conform to the circle defined by the inner edges of the walls 3'. The nozzles are open at their lateral ends below the inner edges of the walls 3'. The spaces $b$, however, are closed at their lateral ends by the inward extensions 3" of the walls 3'. Thus air entering by the lateral channels 4, enters the open end of the nozzles $a$, is forced downward by the opposed walls of each nozzle, passes beneath the lower edges of the plates 7 into close contact with the film on the drum, and then passes radially outward through the discharge spaces $b$ and into the chamber 5. It will thus be seen that the air thoroughly and efficiently dries or desiccates the film on the drum by reason of its impingement against the film with a very considerable kinetic energy and then being deflected outwardly.

The arrangement shown in Figure 4 is substantially the same as described in connection with that of Figures 1 to 3, with the exception that the walls of the air deflecting nozzles are extended upwardly between the walls 3'. In this figure, the outer walls 3 and the inner walls 3' are shown and the openings for the discharge of moisture carrying air upwardly between the nozzle units are at the top or outer edges of the inner walls 3'. These openings are designated b'' and correspond with the openings b of Figure 3. Extending transversely of the outer edges of the walls 3'' are strips 12 which correspond to the walls 5' of Figure 3 and extending inwardly and laterally from the inner edges of the walls 3' are walls 11 which connect the lateral edges of those walls of the nozzles which define the space that opens radially from the drum through the opening b''. While in this Figure 4, no exhaust duct has been shown, it will be understood that such a duct may be provided and connected with a partially encircling chamber covering the area between the walls 3' so as to receive the moisture-laden air discharging from the opening b'' and carry it off in the same manner that the chamber 5 of Figure 2 receives the moisture-laden air and is connected with duct 10 through which such air is carried off. In this Fig. 4, the arrows indicate the path traveled by the air currents. As shown, the air enters from the lateral or side chambers 4 and passes downwardly between the adjacent nozzle walls 11, flowing under the inner edges of the nozzle walls 7 and upwardly to pass out through the openings b'' into a suitable receiving chamber and carry-off duct.

The arrangement shown in Figure 5 is substantially the same as that shown in Figure 4, except that there is provided a cover 14 which extends around and exteriorly of the outer ends of all of the nozzles. In addition to this difference, there is also the difference that the nozzles are connected together adjacent one of the channels by the plates or walls 13 which are in staggered relation with similar plates or walls adjacent the other channel 4 so that the air entering into the openings between unconnected nozzle plates, from one channel 4, as indicated at 11', will follow the course designated by the arrow and pass under the nozzle plate corresponding to plate 7, Figure 3, and along the length of the nozzle and pass out into the other channel 4 through an opening 11' which is directly opposite a plate 13. In other words, the air when entering into the nozzle will be deflected obliquely with respect to the length of the nozzle and will pass out from the opposite side of the nozzle into the other chamber 4 through an opening which is offset circumferentially of the drum from the opening 11' through which it entered. Otherwise than this, the action of the air is substantially the same as in Figure 4.

In Fig. 6, the construction illustrated is precisely the same as that shown in Fig. 4, except that the nozzles and intermediate spaces a and b are each divided into two halves by means of a medial vertical partition 15. This partition has its lower edge slightly spaced from the film of liquid. The air flows out of the channels 4 in the same manner as heretofore described for Fig. 4, and passes out through the openings in the upper ends of the spaces b, as previously described. The only purpose of the partition 15 is to positively deflect the two currents of air passing inward from the opposite channels 4 outward through the open outer ends of the spaces b.

While I have illustrated a structure in which a revolving drum is used and in which the drum is cylindrical, it is self-evident that a mechanism can be provided wherein the film to be dried or desiccated lies on a flat surface instead of on a drum. It will likewise be obvious that the drum may be either cylindrical or conical.

With this construction there is no danger of overheating the material being desiccated as the impinging jets of air striking the film of liquid, rebounding therefrom and passing off through the portions b very rapidly carry off heat and prevent any overheating.

I claim:

1. A device for drying films lying on a supporting surface, comprising a drum on the surface of which lies the liquid film, a housing surrounding the drum comprising numerous consecutive channels, which open in the direction of the peripheral surface of the drum in the form of slots, one part of said channels being connected to gas supply channels, the other part leading to evacuating channels.

2. A device for drying films lying on a supporting surface, comprising the drum on the surface of which the film lies, a housing encircling the drum comprising numerous consecutive channels which open in the direction of the peripheral surface of the drum in the form of slots, a portion of said channels being connected to gas supply channels, the other channels leading to evacuating channels, each second axially running channel wall in the encircling housing extending into close proximity to the film, the intermediate walls being shortened, so that the gas jets enter through a group of slot channels may be removed by suction through the alternate adjacent channels of the other group, the said gas jets being deflected at the edge of the shortened wall.

3. A device for drying films lying on a supporting surface, comprising a drum on the surface of which the film lies, a housing encircling the drum comprising numerous consecutive channels which open in the direction of the peripheral surface of the drum in the form of slots, a portion of said channels being connected to gas supply channels, each second axially directed channel wall extending into close proximity to the film, the intermediate walls being shortened so that the gas jets which enter through a group of slot channels may be removed by suction through the alternate adjacent channels of the other group, the said gas jets being deflected at the edge of the shortened wall, said channels being provided with slots and united to a common housing, connecting alternately at both extremities with annular gas supply channels, each slot channel being alternately closed at one extremity by the wall, the other half communicating only with the supply channel, so that when drying gas is supplied, one of the channels is adapted to serve for air supply and the other for air discharge.

4. A device for drying films lying on a supporting surface, comprising a drum on the surface of which the liquid film lies, a housing enclosing the drum and including numerous consecutive channels which open in the direction of the peripheral surface of the drum in the form of slots, a portion of said channels being connected to gas supply channels, the other channels leading to evacuating channels, the gas channels serving to treat the surface films running parallel to one another on the drum periphery and forming a common housing which is provided with two annular gas supply channels, a gas removing channel surrounding the slot-channel housing, and a middle separating partition for the purpose of separating the discharge of the drying gas currents entering into the slot channels from both ends of the same.

5. An apparatus of the character described, including a traveling support for conveying material in film form, and means constructed and arranged to cause streams of vapor absorbing medium to impinge upon the said film, said means including an assembly of plates shaped to provide alternate supply nozzles and discharge passages, the plate separating each supply nozzle from the corresponding discharge passage being less in length than the plate constituting the wall of the corresponding discharge passage, the last-named plate extending into close proximity to the film on the supporting surface.

6. An apparatus as in claim 5, further characterized by each supply nozzle being open at its lateral ends to receive the drying medium and each discharge passage being open at its end remote from the traveling support to discharge the moisture-laden medium.

JÖRGEN BRABAK.